(12) United States Patent
Tajima et al.

(10) Patent No.: US 9,637,559 B2
(45) Date of Patent: May 2, 2017

(54) EMULSIFIER AND PRODUCTION METHOD THEREFOR, AND PRODUCTION METHOD FOR EMULSION

(75) Inventors: Kazuo Tajima, Kanagawa (JP); Yoko Imai, Kanagawa (JP); Kaori Toyoda, Kanagawa (JP)

(73) Assignee: KANAGAWA UNIVERSITY, Kanagawa (JP)

( * ) Notice: Subject to any disclaimer, the term of this patent is extended or adjusted under 35 U.S.C. 154(b) by 0 days.

(21) Appl. No.: 13/822,910

(22) PCT Filed: Aug. 31, 2011

(86) PCT No.: PCT/JP2011/069701
§ 371 (c)(1),
(2), (4) Date: May 23, 2013

(87) PCT Pub. No.: WO2012/035978
PCT Pub. Date: Mar. 22, 2012

(65) Prior Publication Data
US 2013/0253077 A1    Sep. 26, 2013

(30) Foreign Application Priority Data
Sep. 14, 2010 (JP) ................................. 2010-205661

(51) Int. Cl.
*C08B 30/00*  (2006.01)
*B01F 17/00*  (2006.01)

(52) U.S. Cl.
CPC .......... *C08B 30/00* (2013.01); *B01F 17/0028* (2013.01)

(58) Field of Classification Search
CPC ........ B01F 3/08; B01F 3/0803; B01F 3/0807; B01F 3/0811; B01F 3/2014; C08B 30/00
USPC .................................. 516/72, 73; 525/54.24
See application file for complete search history.

(56) References Cited

U.S. PATENT DOCUMENTS

| 6,482,581 B1 * | 11/2002 | Govers et al. ................ 430/527 |
| 7,829,600 B1 * | 11/2010 | Trksak et al. .................. 516/73 |
| 2007/0102130 A1 * | 5/2007 | Satyavolu et al. ............ 162/179 |

FOREIGN PATENT DOCUMENTS

| JP | 56056223 A | 5/1981 |
| JP | 60244335 A | 12/1985 |
| JP | 62003748 A | 1/1987 |
| JP | 63062535 A | 3/1988 |
| JP | 08275726 A | 10/1996 |
| JP | 2005270975 A | 10/2005 |
| JP | 2006239666 A | 9/2006 |
| WO | 2005096711 A2 | 10/2005 |

OTHER PUBLICATIONS

Shaw, P.E., et al.; Symposium on Chemistry of Essential Oils, 1974, p. 785-787.*
Garden-Robinson, J.; Food Storage Guide, 2006, p. 1-12.*
International Search Report for International application No. PCT/JP2011/069701, Nov. 29, 2011, with English translation.

* cited by examiner

*Primary Examiner* — Robert Jones, Jr.
(74) *Attorney, Agent, or Firm* — Cantor Colburn LLP

(57) ABSTRACT

Provided are an emulsifier derived from sugar polymer capable of successfully emulsifying even unsaturated oil, a production method therefore, and a production method for emulsion using the emulsifier. This emulsifier can be obtained by a production method including an emulsification improving step of improving the emulsification of sugar polymer particles dispersed in water. In this emulsification improving step, the emulsification of sugar polymer particles can be improved by an action of an emulsification aid that is at least water-soluble one kind selected from salts, an amphiphilic agent, saccharides, an organic acid, and an amino acid. Alternatively, the emulsification of sugar polymer particles can be improved by storing the sugar polymer particles dispersed in water at a low temperature of 10° C. or lower.

19 Claims, 1 Drawing Sheet

FIG. 1
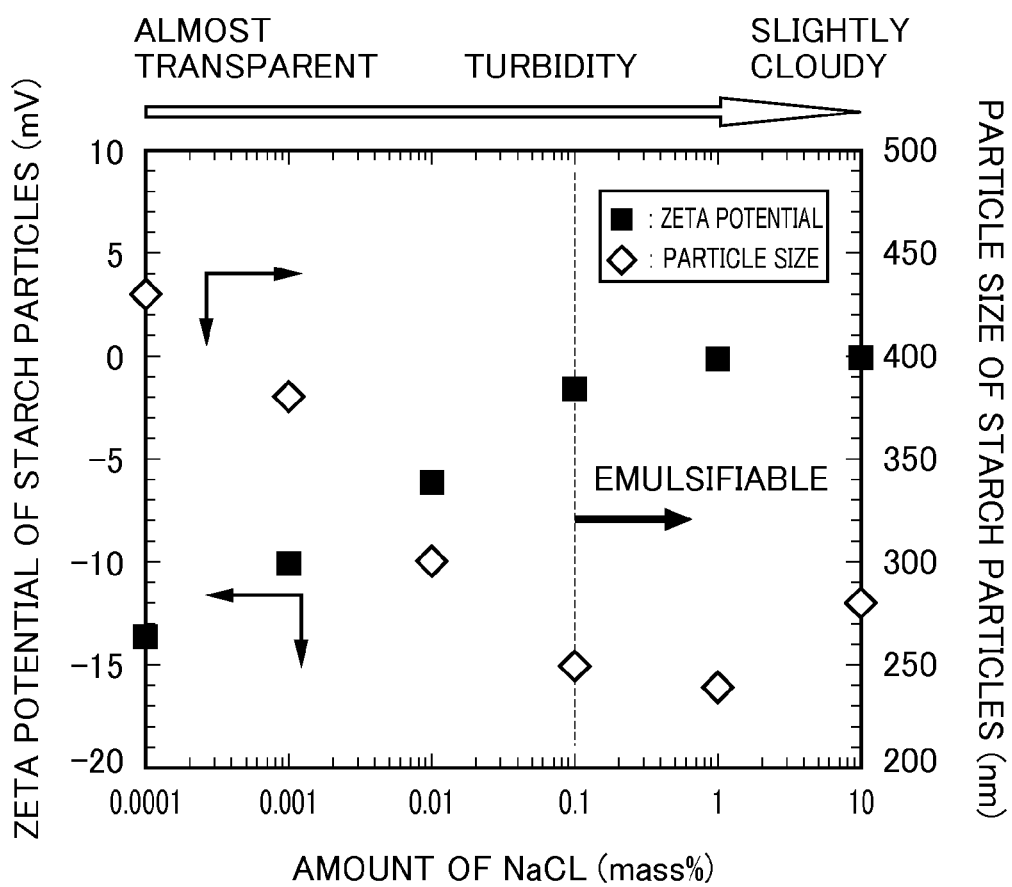
FIG. 2A
FIG. 2B
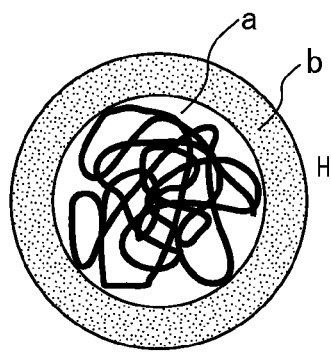
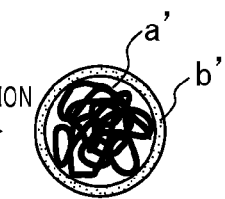

EMULSIFIER AND PRODUCTION METHOD THEREFOR, AND PRODUCTION METHOD FOR EMULSION

CROSS REFERENCE TO RELATED APPLICATIONS

This is a U.S. National Stage of Application No. PCT/JP2011/069701, filed on 31 Aug. 2011. Priority under 35 U.S.C. §119(a) and 35 U.S.C. §365(b) is claimed from Japanese Application No. 2010-205661, filed 14 Sep. 2010, the disclosure of which is also incorporated herein by reference.

TECHNICAL FIELD

The present invention relates to an emulsifier and a production method therefore, and a production method for an emulsion.

BACKGROUND ART

Conventionally, the emulsification and dispersion of functional oil based agents or functional granules into water were conducted by selecting a surfactant according to the required HLB of the functional oil based agents or properties of granule surface. In addition, the required HLB value of the surfactant used as an emulsifier had to be chosen distinctively according to whether O/W type emulsions or W/O type emulsions were to be formed; moreover, the thermal stability and the long term stability were not sufficient, and therefore, various different types of surfactants also had to be used. (ref. Non-patent document 1-4).

However, surfactants are not very biodegradable and produce a gas, thus causing serious problems of environmental pollution. Furthermore, although physicochemical emulsification methods such as the HLB method, phase inversion emulsification method, phase inversion temperature emulsification method, gel emulsification method, etc., have generally been used as conditioning methods for emulsified preparations of functional oil-based agents, in each case, because an action to thermodynamically stabilize the system by reducing the surface energy of the oil/water is the base of the emulsification conditioning process, the emulsification method was therefore accompanied by extremely complicated and extensive effort to select the most suitable emulsifier, and in any case, when a variety of oils had been mixed together, it was almost impossible for these oils to be stably emulsified.

For this reason, Patent Document 1 proposes an emulsifier comprising, as a main component, a vesicle composed of an amphiphilic agent with self-organization ability or a nano-particulated biopolymer, and an emulsification method using the emulsifier. In this emulsification method, the emulsifier is attached to an oil/water interface to form a three-phase structure of a water phase, an emulsifier phase, and an oil phase. The method is thus referred to as a so-called three-phase emulsification method.

Patent Document 1: Japanese Unexamined Patent Application, Publication No. 2006-239666
Non-patent document 1: "Emulsion Science" edited by P. Sherman, Academic Press Inc. (1969)
Non-patent document 2: "Microemulsions-Theory and Practice" edited by Leon M. Price, Academic Press Inc. (1977)
Non-patent document 3: "A technique of Emulsification and Solubilization" by Atsushi, Tuji, Kougakutosho Ltd. (1976)
Non-patent document 4: "Development Technique for Functional Surfactants" CMC Publishing Co., Ltd. (1998)

DISCLOSURE OF THE INVENTION

Problems to be Solved by the Invention

However, as a result of consideration, the present inventors newly found that the method disclosed in Patent Document 1 had a problem that excellent emulsification could not be achieved depending on the combination of an emulsifier and an oily component to be emulsified. For example, emulsifiers derived from sugar polymers, such as starch, had excellent emulsification ability for saturated oils, but had remarkably inferior emulsification ability for unsaturated oils.

The emulsifiers derived from sugar polymers as mentioned herein have high safety for human bodies, and are therefore expected for use as food emulsifiers. On the other hand, naturally-derived oils, such as animal or vegetable oils, have a high content of unsaturated oils; therefore, the ability of emulsifying such unsaturated oils is very important for the expansion of the range of application (use) of emulsifiers.

The present invention has been made in consideration of the above situation, and an object of the invention is to provide an emulsifier derived from a sugar polymer capable of successfully emulsifying even unsaturated oils, and a production method therefore and a production method for an emulsion.

Means for Solving the Problems

The present inventors found that the emulsification of sugar polymer particles can be improved by, for example, increasing the hydrophobicity of the particles dispersed in water, so that even unsaturated oils can be successfully emulsified. Thus, the present invention has been completed. More specifically, the present invention provides the following:

(1) An emulsifier comprising sugar polymer particles dispersed in water and an emulsification aid dissolved in the water and improving emulsification of the sugar polymer particles.

(2) The emulsifier according to (1), wherein the emulsification aid is at least one member selected from the group consisting of water-soluble salts, amphiphilic agents, saccharides, organic acids, and amino acids.

(3) The emulsifier according to (1) or (2), wherein the sugar polymer particles dispersed in water are obtained by a method comprising:

a dispersing step of dispersing granules containing an aggregate of the sugar polymer particles in water to prepare a dispersion;

a released product producing step of swelling the granules, and breaking hydrogen bonds derived from the granules under reversible conditions, thereby producing a released product of the aggregate whose higher-order structure is released; and a particle dispersing step of breaking hydrogen bonds in the aggregate to separate and disperse the sugar polymer particles in the water.

(4) A method for producing an emulsifier, comprising an emulsification improving step of improving emulsification of the sugar polymer particles dispersed in water.

(5) The method for producing an emulsifier according to (4), wherein the emulsification improving step is a step of improving emulsification of the sugar polymer particles dispersed in water by an action of an emulsification aid that is at least one member selected from the group consisting of water-soluble salts, amphiphilic agents, saccharides, organic acids, and amino acids.

(6) The method for producing an emulsifier according to (4), wherein the emulsification improving step is a step of storing the sugar polymer particles dispersed in water at a low temperature of 10° C. or less.

(7) The method for producing an emulsifier according to any one of (4) to (6), wherein the sugar polymer particles dispersed in water are obtained by a method comprising:

a dispersing step of dispersing granules containing an aggregate of the sugar polymer particles in water to prepare a dispersion;

a released product producing step of swelling the granules, and breaking hydrogen bonds derived from the granules under reversible conditions, thereby producing a released product of the aggregate whose higher-order structure is released; and a particle dispersing step of breaking hydrogen bonds in the aggregate to separate and disperse the sugar polymer particles in the water.

(8) A method for producing an emulsion, comprising mixing the emulsifier according to any one of (1) to (3) or an emulsifier obtained by the production method according to any one of (4) to (7), and an oily component to be emulsified.

(9) The method for producing an emulsion according to (8), wherein the oily component to be emulsified is an unsaturated oil.

Effects of the Invention

According to the present invention, the emulsification of sugar polymer particles can be improved by, for example, increasing the hydrophobicity of the particles dispersed in water, so that even unsaturated oils can be successfully emulsified.

BRIEF DESCRIPTION OF THE DRAWINGS

FIG. 1 shows the zeta potential and particle size of starch particles when NaCl is added to an aqueous solution containing 0.5 mass % starch particles.

FIG. 2 schematically shows the change of a sugar polymer particle dispersed in water when the particle is hydrophobized.

EXPLANATION OF REFERENCE NUMERALS (a), (a'): Sugar polymer particle
(b), (b'): Hydration layer

PREFERRED MODE FOR CARRYING OUT THE INVENTION

Embodiments of the present invention are described below, however, the present invention is not limited thereto.
In the following, the background and principle of the present invention are described before entering into the description of the emulsifier, the production method therefore, and the production method for an emulsion according to the present invention.

First, as a pre-experiment, the emulsification ability of a polysaccharide (starch particles) produced by using granules of potato starch, which was a type of sugar polymer, on various oily components to be emulsified was evaluated. More specifically, a polysaccharide emulsifier aqueous solution containing 0.5 mass % starch particles, and an oily component to be emulsified (saturated oil or unsaturated oil) were mixed in a mass ratio of 1:1 and stirred by a homogenizer. Then, the emulsified state of the resulting mixture was evaluated. The evaluation criteria were as follows: one successfully emulsified: (+), one not emulsified (one undergoing phase separation): (−). Table 1 below shows the results. Further, Table 2 below shows the physical properties of the oily components to be emulsified used in this experiment. The interfacial tension was measured by a Wilhelmy method (25° C.).

TABLE 1

| Saturated oil | Emulsification evaluation | Unsaturated oil | Emulsification evaluation |
|---|---|---|---|
| Squalane | (+) | Squalene | (−) |
| Dodecane | (+) | 1-Dodecene | (−) |
| Hexadecane | (+) | 1-Hexadecene | (+) |
| Hexane | (+) | 1-Hexene | (−) |
| Octane | (+) | 1-Octene | (−) |
| 2,2,4,4,6,8,8-Heptamethyl-nonane | (+) | Glyceride vegetable oil | (−) |
|  |  | DHA | (−) |
|  |  | EPA | (−) |

TABLE 2

| | Dielectric constant | Oil/water interfacial tension (mNm$^{-1}$) |
|---|---|---|
| Squalane | 2.11 | 49.50 |
| Squalene | 2.33 | 22.53 |
| Dodecane | 2.02 | 47.93 |
| 1-Dodecene | 2.12 | 24.91 |
| Hexadecane | 2.01 | 37.61 |
| 1-Hexadecene | 2.13 | 33.49 |
| 2,2,4,4,6,8,8-Heptamethyl-nonane | 2.05 | 46.98 |

Next, FIG. 1 shows the zeta potential and particle size of starch particles when NaCl was added to an aqueous solution containing 0.5 mass % starch particles. As is clear from FIG. 1, the starch particles were shrunk as the amount of NaCl was increased, while the zeta potential increased from −13.5 mV to nearly zero mV.

Considering the condition of the starch particles in water based on the results of FIG. 1 and the interfacial tension values in Table 2, the following discussion can be provided:

(i) The oil/water interfacial tension values indicate that unsaturated oils generally have a lower self-cohesive force than that of saturated oils.

(ii) The starch particles have a thick hydration layer, and their structure is swollen and extended.

Accordingly, the following phenomena are considered to occur.

(iii) Due to the thick hydration layer of the starch particles and the overly far distance of the oil/particle interface, the starch particles cannot be attached or fixed in the oil/water interface.

(iv) The starch particles themselves are swollen and extended by hydration, and are rough-structure particles as a whole, therefore they have a low cohesive force to the oil/water interface (relatively low van der Waals attractive force).

The present inventors conducted extensive studies based on these findings, and consequently found that the emulsification of sugar polymer particles was improved by adding salts, amphiphilic agents, organic acids, or the like to increase the hydrophobicity of the sugar polymer particles.

As schematically shown in FIG. 2A, a sugar polymer particle (a) dispersed in water has a hydration layer (b) surrounding the particle. When the hydrophobicity of the sugar polymer particle (a) is increased, the density in the particle becomes dense as shown in FIG. 2B (a'), while the hydration layer is shrunk as shown in FIG. 2B (b'). Consequently, the distance of the oil/particle interface becomes short, and the sugar polymer particles can be attached and fixed in the oil/water interface. Moreover, because the intraparticle density becomes dense, the van der Waals attractive force increases, while the cohesive force to the oil/water interface also increases. Thereby, even unsaturated oils can be successfully emulsified.

As a result of further studies, it was found that the addition of saccharides, amino acids, or other substances that did not necessarily increase the hydrophobicity of sugar polymer particles resulted in the improvement in the emulsification of the sugar polymer particles, although the principle was unknown.

The present invention has been completed on the basis of the above-described background.

Emulsifier

The emulsifier of the present invention comprises sugar polymer particles dispersed in water, and an emulsification aid dissolved in the water and improving the emulsification of the sugar polymer particles.

The sugar polymer particles are particles of a polymer having a glucoside structure, such as starch or cellulose, and are single particles or aggregates of particles. Examples of the sugar polymer include those produced by microorganisms using, as components, some saccharides selected from monosaccharides, such as ribose, xylose, rhamnose, fucose, glucose, mannose, glucuronic acid, and gluconic acid; natural polymers, such as xanthan gum, gum arabic, guar gum, karaya gum, carrageenan, pectin, fucoidan, quince-seed gum, trant gum, locust bean gum, galactomannan, curdlan, gellan gum, fucogel, casein, gelatin, starch, and collagen; semi-synthetic polymers, such as methyl cellulose, ethyl cellulose, methyl hydroxypropyl cellulose, carboxymethyl cellulose, hydroxymethyl cellulose, hydroxypropyl cellulose, sodium carboxymethyl cellulose, propylene glycol alginate, cellulose crystal structure, starch/sodium acrylate graft polymer, and hydrophobized hydroxypropyl methylcellulose; synthetic polymers, such as polyvinyl alcohol, polyvinyl pyrrolidone, carboxyvinyl polymer, polyacrylate, and polyethylene oxide; and the like. Among these sugar polymers, starch is preferred in view of excellent safety and low cost.

The concentration of the sugar polymer particles in water is preferably 0.05 to 1.0 mass %.

The emulsification aid is not particularly limited as long as it can improve the emulsification of the sugar polymer particles, however, the emulsification aid is preferably at least one member selected from water-soluble salts, amphiphilic agents, saccharides, organic acids, and amino acids. When a salt is added, the hydration layer of the sugar polymer particles is dehydrated by the action of cations to increase the hydrophobicity of the particles, thereby improving the emulsification of the particles. Further, when an organic acid is added, the hydration layer of the sugar polymer particles is dehydrated to increase the hydrophobicity of the particles, thereby improving the emulsification of the particles. Moreover, when an amphiphilic agent is added, the amphiphilic agent enters into the sugar polymer particles to increase the hydrophobicity of the particles, thereby improving the emulsification of the particles. In addition, the emulsification of the sugar polymer particles can also be improved by adding saccharides or amino acids, although the principle is unknown.

The above-mentioned salts may be inorganic salts or organic salts. Examples of inorganic salts include sodium chloride, potassium chloride, magnesium chloride, ammonium chloride, potassium chlorate, ferrous chloride, ferric chloride, sodium carbonate, etc. Examples of organic salts include sodium acetate, sodium succinate, sodium citrate, sodium glutamate, sodium aspartate, etc. Among these, multivalent cation salts are more preferable than monovalent cation salts because the multivalent cation salts have a higher dehydration power. The amount of salt to be added is preferably 0.01 to 10 mass % in the emulsifier solution, but is not particularly limited thereto.

Examples of amphiphilic agents include fatty acid esters, sugar esters, and the like.

The amount of amphiphilic agent to be added is preferably 0.1 to 1.0 mass % in the emulsifier solution, but is not particularly limited thereto.

Examples of saccharides include monosaccharides, disaccharides, trisaccharides, tetrasaccharides, etc. Examples of monosaccharides include glucose, galactose, fructose, mannose, etc. Examples of disaccharides include sucrose, maltose, lactose, etc. Examples of trisaccharides include maltotriose, raffinose, etc. Examples of tetrasaccharides include nystose, nigerotetraose, etc.

The amount of saccharide to be added is not particularly limited, however, in the case of maltose, for example, the amount thereof is preferably 10.0 mass % in the emulsifier solution.

Examples of organic acids include cholic acid, citric acid, succinic acid, etc.

The amount of organic acid to be added is preferably 0.5 to 10 mass % in the emulsifier solution, but is not particularly limited thereto.

Examples of amino acids include glutamic acid, aspartic acid, glycine, lysine, arginine, etc.

The amount of amino acid to be added is preferably 0.5 to 10 mass % in the emulsifier solution, but is not particularly limited thereto.

In addition to the above-listed emulsification aids, non-electrolytes, such as alcohols and glycols, can also be used.

Production Method for Emulsifier

The production method for the emulsifier according to the present invention comprises an emulsification improving step of improving the emulsification of sugar polymer particles dispersed in water.

In the emulsification improving step, the emulsification of sugar polymer particles dispersed in water can be improved by the action of an aforementioned emulsification aid. More specifically, the emulsification of sugar polymer particles can be improved by adding the emulsification aid to the sugar polymer particles dispersed in water. Alternatively, the emulsification of sugar polymer particles can be improved by previously dissolving the emulsification aid in water, and dispersing the sugar polymer particles in this solution. The emulsification aid is, as described above, at least one member selected from water-soluble salts, amphiphilic agents, saccharides, organic acids, and amino acids.

Moreover, in the emulsification improving step, the sugar polymer particles dispersed in water may be stored at a low temperature of 10° C. or less. In this case, the hydration layer of the sugar polymer particles is dehydrated by so-called aging phenomena to thereby improve the emulsification of the particles. The storage temperature is preferably 3.0 to 7.0° C., more preferably 4.0 to 5.0° C. The storage period is not particularly limited as long as the hydration layer of the sugar polymer particles is dehydrated to thereby improve the emulsification of the particles, however the storage period is generally about 3 to 7 days.

Method for Obtaining Sugar Polymer Particles Dispersed in Water

The sugar polymer particles dispersed in water described above can be obtained in the same manner as sugar polymer particles conventionally known as emulsifiers (Japan Patent No. 3855203). However, from the viewpoint of suppressing the variation of the size of sugar polymer particles, it is preferable to obtain them by the following production method.

The production method comprises at least:

a dispersing step of dispersing granules containing an aggregate of sugar polymer particles in water to prepare a dispersion;

a released product producing step of swelling the granules, and breaking hydrogen bonds derived from the granules under reversible conditions, thereby producing a released product of the aggregate whose higher-order structure is released; and a particle dispersing step of breaking hydrogen bonds in the aggregate to separate and disperse the sugar polymer particles in the water. Each step is described in detail below.

(Dispersing Step)

In the dispersing step, granules containing an aggregate of sugar polymer particles are dispersed in water to prepare the dispersion. When aggregates of the granules remain, the efficiency of the subsequent steps, such as swelling, is degraded. Therefore, the granules are dispersed in water to eliminate the aggregate of the granules or reduce the amount of the aggregates. In the water used for dispersion, an aforementioned emulsification aid may be dissolved in advance.

The dispersion may be performed by a standard method depending on the sugar polymer used. In general, for example, starch or the like is sufficiently dispersed in ambient temperature water, and xanthan gum or the like is added to hot water.

The amount of granules in the dispersion may be suitably determined in consideration of operability and the request for mass production. That is, when the amount of granules is too large, the increased viscosity of the swollen granules makes stirring and other operations difficult, whereas an overly low amount of granules is disadvantageous in terms of mass production. Accordingly, the amount of granules may be suitably determined in consideration of these factors depending on the polycondensation polymer used. Generally, the amount of granules is about 1 mass % or less.

(Released Product Producing Step)

In the released product producing step, the granules are swollen, and inter-hydrogen bonds between polymer particles derived from the granules are broken under reversible conditions, thereby producing a released product of the aggregate whose higher-order structure is released. This lays out a situation in which the higher-order structure is released, from which the sugar polymer particles are easily separated, while the intra-hydrogen bonds of the sugar polymer particles are recovered, so that the emulsification ability of the sugar polymer particles can be maintained.

When the granules are swollen, the sugar polymer particles are hydrated, and the action of breaking hydrogen bonds can be efficiently imparted. The swelling of the granules can be generally confirmed by, for example, the transparency of the granules and the increase in the viscosity of the dispersion. The swelling may be performed by a standard method depending on the sugar polymer used.

The breakage of hydrogen bonds under reversible conditions is breakage under mild conditions in which the broken hydrogen bonds can be recovered. The order of relative ease of breaking hydrogen bonds in the aggregate is presumably as follows: hydrogen bonds forming the higher-order structure, inter-hydrogen bonds between the particles, intra-hydrogen bonds in the particles, and covalent bonds in the sugar polymer. As a result of breakage of hydrogen bonds under mild conditions, breakage of covalent bonds in the sugar polymer is avoided, and the emulsification ability of the sugar polymer particles can be maintained. The breakage of hydrogen bonds can be confirmed by, for example, the decrease in the viscosity of the dispersion and the observation of the released higher-order structure of the aggregate by a microscope.

The breakage of inter-hydrogen bonds can be performed by physical treatment, such as heating or stirring, and/or chemical treatment, such as treatment with preparations (e.g., urea and thiourea). Heating temperature, stirring speed, preparation amount, treatment time, and other conditions are adjusted so that the breakage of hydrogen bonds is reversible. Specific conditions may be suitably determined depending on the sugar polymer used. For example, the breakage of inter-hydrogen bonds may be performed by mild stirring at 70 to 90° C., preferably about 80° C., for 20 to 40 minutes, preferably about 30 minutes. The reversibility of hydrogen bond breakage can be confirmed by the reversible change in viscosity depending on the temperature change.

(First Recovery Step)

It is preferable that the production method comprises a first recovery step of partially recovering the broken hydrogen bonds. This allows recovery of the inter-hydrogen bonds between the particles; therefore, the distribution of the broken hydrogen bonds between the particles becomes uniform in a particle dispersing step, described latter, and the variation of the size of the obtained particles can be suppressed. Moreover, since the intra-hydrogen bonds in the particles are also recovered, the emulsification properties of the particles can be prevented from being impaired.

The recovery in the first step can be achieved by allowing the dispersion under non-treatment conditions (e.g., at ambient temperature, without stirring, in the absence of chemical preparations) for several hours. The recovery of the hydrogen bonds can be confirmed by the reversible change in viscosity depending on the temperature change.

(Particle Dispersing Step)

In the particle dispersing step, hydrogen bonds in the aggregate are broken to separate and disperse the sugar polymer particle in water. Since the inter-hydrogen bonds between the particles are reformed, the distribution of the broken hydrogen bonds becomes almost uniform, and the variation of the size of the sugar polymer particles to be separated and dispersed is consequently suppressed. The separation and expansion of the sugar polymer particles are not limited to isolation of the sugar polymer particles into single particles, but include separation and dispersion of the particles as aggregates of the several sugar polymer particles.

The breakage of intra-hydrogen bonds in the particle dispersing step is not particularly limited as long as it is performed under conditions in which the covalent bonds in the sugar polymer are not substantially broken. Typically, the breakage of hydrogen bonds in this step may be the same as that in the aforementioned released product producing step. That is, the breakage of hydrogen bonds can be performed by physical treatment, such as heating or stirring, and/or chemical treatment, such as treatment with preparations (e.g., urea and thiourea). Heating temperature, stirring speed, preparation amount, treatment time, and other conditions are adjusted so that the covalent bonds in the sugar polymer are not broken. Specific conditions may be suitably determined depending on the sugar polymer used. For example, the breakage of inter-hydrogen bonds may be performed by mild stirring at 70 to 90° C., preferably about 80° C., for 20 to 40 minutes, preferably about 30 minutes.

The breakage of inter-hydrogen bonds may be performed until sugar polymer particles (simple particle or aggregates of particles) having a particle size of 50 to 800 nm as measured by a fiber-optics particle analyzer FPAR (produced by Otsuka Electronics Co., Ltd.) are obtained with a desired yield. Sugar polymer particles having such a particle size are known to exhibit excellent emulsification ability (e.g., JP 2006-239666 A). However, it should be noted that excess breakage of hydrogen bonds may have an adverse influence on bonds in the sugar polymer particles.

(Second Recovery Step)

It is preferable that the production method further comprises a second recovery step of partially recovering the broken intra-hydrogen bonds. This allows recovery of the intra-hydrogen bonds in the sugar polymer particles, so that the original emulsification ability can be recovered.

The recovery in the second recovery step is not particularly limited. Typically, the recovery in this step may be the same as that in the first recovery step described above. That is, the recovery in this step can be achieved by allowing the dispersion under non-treatment conditions (e.g., at ambient temperature, without stirring, in the absence of chemical preparations) for several hours. The recovery of the hydrogen bonds can be confirmed by the reversible change in viscosity depending on the temperature change.

Production Method for Emulsion

In the production method for an emulsion according to the present invention, an aforementioned emulsifier or an emulsifier obtained by the above-mentioned production method is mixed with an oily component to be emulsified.

In the aforementioned emulsifier or the emulsifier obtained by the above-mentioned production method, the emulsification of the sugar polymer particles is improved by the action of the emulsification aid or by so-called aging phenomena.

Accordingly, mixing the emulsifier and an oily component to be emulsified, with or without addition of substances to be distributed in the water phase, results in an emulsion in which the oil and water phases are well dispersed.

In the method for producing an emulsion according to the present invention, the oily component to be emulsified is not particularly limited. Examples thereof include light oil, bunker A, bunker C, tar, biodiesel, recycled heavy oil, waste cooking oil, cosmetic oil, cooking oil, industrial oil (e.g., silicone oil and kerosene), and various other oils. Among these, sugar polymer particles to be used in the present invention have higher safety, and are therefore preferably used to emulsify compositions for oral administration (e.g., foods and beverages, and oral-administration preparations), external preparations, cosmetics, agricultural chemicals, and other products for use in living bodies. In particular, naturally-derived oils, such as animal or vegetable oils, have a high content of unsaturated oils; however, the present invention is advantageous in that such unsaturated oils can also be emulsified.

In the above-described method for producing an emulsion, the emulsification of sugar polymer particles is previously improved before the particles are mixed with an oily component to be emulsified, however, the emulsification of sugar polymer particles may be improved after the particles are mixed with an oily component to be emulsified. For example, the emulsification of sugar polymer particles can be improved by mixing the sugar polymer particles dispersed in water and an oily component to be emulsified, and then adding an aforementioned emulsification aid, followed by vigorous stirring.

EXAMPLES

Example 1: Confirmation of Effect of Addition of Emulsification Aid (1)

Potato starch granules were added to water to a concentration of 1 mass %, and dispersed by stirring the water, thereby preparing a dispersion. The dispersion was heated to 80° C. while stirring, and stirring was continued until the white starch granules became transparent. Thus, the granules were swollen. The viscosity of the dispersion increased in the course of the swelling process.

Subsequently, after stirring was further continued at 80° C. for 30 minutes, the dispersion was allowed to stand at room temperature overnight. The viscosity of the dispersion decreased during heating.

Next, the resulting solution was diluted with water so that the starch particle concentration became 0.5 mass %. The diluted solution was heated to 80° C. while stirring, and stirring was continued at 80° C. for 30 minutes. Thereafter, the solution was cooled to room temperature. When the particle size distribution in the solution was measured by a fiber-optics particle analyzer FPAR (produced by Otsuka Electronics Co., Ltd.), peaks were observed in the particle size range of 70 to 200 nm.

To the thus-prepared starch particle aqueous solution, emulsification aids were each added to a concentration shown in Tables 3 to 5 below, and each of the resulting mixture was mixed with squalene, which was an oily component to be emulsified. The squalene concentration was fixed at 50 mass %. The emulsification aids used were salts (NaCl and $CaCl_2$), a saccharide (maltose), and an amphiphilic agent (e.g. sugar ester; M-1670, produced by Mitsubishi-Kagaku Foods Corporation).

After the obtained solutions were stirred by a homogenizer, their emulsified state was evaluated. The evaluation criteria were as follows: one stably emulsified for 24 hours or more: (+), and one undergoing phase separation: (−). Tables 3 to 5 below show the results.

TABLE 3

| | Concentration of emulsification aid (mass %) | | | | |
|---|---|---|---|---|---|
| | 0.001 | 0.01 | 0.1 | 1.0 | 10.0 |
| NaCl | (−) | (−) | (+) | (+) | (+) |
| $CaCl_2$ | (−) | (+) | (+) | (+) | (+) |

TABLE 4

| | Concentration of emulsification aid (mass %) | | | | |
|---|---|---|---|---|---|
| | 0.5 | 1.0 | 3.0 | 5.0 | 10.0 |
| Maltose | (−) | (−) | (−) | (−) | (+) |

TABLE 5

| | Concentration of emulsification aid (mass %) | | | |
|---|---|---|---|---|
| | 0.001 | 0.01 | 0.1 | 1.0 |
| Sugar ester | (−) | (−) | (+) | (+) |

As shown in Tables 3 to 5, when any of the salts (NaCl and CaCl$_2$), saccharide (maltose), and amphiphilic agent (e.g. sugar ester; M-1670, produced by Mitsubishi-Kagaku Foods Corporation) was used as the emulsification aid, the squalene was stably emulsified for 24 hours or more. In particular, CaCl$_2$ showed excellent emulsification ability at a concentration one-tenth that of NaCl. The reason for this is considered that divalent calcium ions have a higher dehydration power than monovalent sodium ions, and work at a lower concentration so that the zeta potential of the starch particles is close to zero.

Example 2: Confirmation of Effect of Addition of Emulsification Aid (2)

Emulsification aids (0.5 part by mass) were each added to 49.5 parts by mass of a starch particle aqueous solution prepared in the same manner as in Example 1, and each of the resulting mixtures was mixed with 50 parts by mass of squalene, which was an oily component to be emulsified. The emulsification aids used were organic acid salts (sodium citrate and sodium glutamate), organic acids (ascorbic acid, cholic acid, citric acid, and succinic acid), and amino acids (glutamic acid, glycin, ricin, and arginine). All of these emulsification aids are available from Wako Pure Chemical Industries, Ltd. After each of the obtained solutions was stirred by a homogenizer, their emulsified state was evaluated. As a result, when any of the emulsification aids was used, the squalene was stably emulsified for 24 hours or more.

Example 3: Confirmation of Emulsification Improvement Effect by Low-temperature Storage A starch particle aqueous solution prepared in the same manner as in Example 1 was stored at 5° C. for a certain period of time so that aging of the starch particles was promoted. After the elapse of a certain period of time, the starch particle aqueous solution and squalene, which was an oily component to be emulsified, were mixed in a mass ratio of 1:1, and stirred by a homogenizer. Then, the emulsified state was evaluated. The evaluation criteria were as follows: one stably emulsified for 24 hours or more: (+), and one undergoing phase separation: (−). Table 6 shows the results.

TABLE 6

| | Storage period at low temperature | | | | |
|---|---|---|---|---|---|
| | 1 day | 3 days | 5 days | 7 days | 11 days |
| Emulsified state | (−) | (+) | (+) | (+) | (−) |

As shown in Table 6, when the starch particle aqueous solution was stored at 5° C. for 3 to 7 days, the squalene was stably emulsified for 24 hours or more. The average particle size of the starch particles stored at 25° C. for one day was 150 nm, while the average particle size of the starch particles stored at 5° C. for one day was 100 nm, which indicated that the particle size was obviously reduced by low-temperature storage. The reason for this is considered to be attributable to hydrophobization of the starch particles due to aging.

Example 4: Confirmation of Emulsification Ability for Other Oily Components to be Emulsified NaCl (0.5 part by mass) was added to 49.5 parts by mass of a starch particle aqueous solution prepared in the same manner as in Example 1, and the resulting mixture was mixed with 50 parts by mass of rapeseed oil or olive oil, which was an oily component to be emulsified.

Each of the obtained solutions was stirred by a homogenizer and allowed to stand at 25° C. for a whole day and night. Then, their emulsified state was evaluated. As a result, both of the rapeseed oil and olive oil were stably emulsified.

Example 5: Confirmation of Emulsification Ability of Other Sugar Polymer Particles A 0.5 mass % carrageenan particle aqueous solution and a 0.3 mass % xanthan gum particle aqueous solution were prepared in the same manner as in Example 1, except that carrageenan or xanthan gum was used as the sugar polymer in place of potato starch.

Then, 0.5 part by mass of NaCl was added to 49.5 parts by mass of the sugar polymer particle aqueous solution (the carrageenan particle aqueous solution or the xanthan gum particle aqueous solution), and the resulting mixture was mixed with 50 parts by mass of squalene, which was an oily component to be emulsified.

After each of the obtained solutions was stirred by a homogenizer, their emulsified states were evaluated. As a result, when either carrageenan or xanthan gum was used as the sugar polymer, the squalene was stably emulsified for 24 hours or more.

The invention claimed is:
1. An emulsifier consisting of: water; sugar polymer particles dispersed in the water; and an emulsification aid dissolved in the water and improving emulsification of the sugar polymer particles,
    wherein a hydration layer is formed around the sugar polymer particles dispersed in the water,
    wherein the particle size of the sugar polymer particles is 50 to 800 nm, and
    wherein the sugar polymer constituting the sugar polymer particles is
    (a) a sugar polymer produced by a microorganism using, as a component, saccharides selected from monosaccharides;
    (b) an unmodified natural polymer;
    (c) methyl cellulose, ethyl cellulose, methyl hydroxypropyl cellulose, carboxymethyl cellulose, hydroxymethyl cellulose, hydroxypropyl cellulose, sodium carboxymethyl cellulose, propylene glycol alginate, a cellulose crystal structure, a starch/sodium acrylate graft polymer, hydrophobized hydroxypropyl methylcellulose; or (d) polyvinyl alcohol, polyvinyl pyrrolidone, carboxyvinyl polymer, polyacrylate, or polyethylene oxide.

2. The emulsifier according to claim 1, wherein the emulsification aid is at least one member selected from the group consisting of water-soluble saccharides, and amino acids.

3. A method for improving emulsification that improves emulsification of sugar polymer particles dispersed in water, the method comprising a step of blending an emulsification aid that is at least one member selected from the group consisting of water-soluble salts, amphiphilic agents, saccharides, organic acids, and amino acids into the water in which the sugar polymer particles are dispersed,
  wherein a hydration layer is formed around the sugar polymer particles dispersed in the water,
  wherein the particle size of the sugar polymer particles is 50 to 800 nm, and
  wherein the sugar polymer constituting the sugar polymer particles is
  (a) a sugar polymer produced by a microorganism using, as a component, saccharides selected from monosaccharides;
  (b) an unmodified natural polymer;
  (c) methyl cellulose, ethyl cellulose, methyl hydroxypropyl cellulose, carboxymethyl cellulose, hydroxymethyl cellulose, hydroxypropyl cellulose, sodium carboxymethyl cellulose, propylene glycol alginate, a cellulose crystal structure, a starch/sodium acrylate graft polymer, hydrophobized hydroxypropyl methylcellulose; or
  (d) polyvinyl alcohol, polyvinyl pyrrolidone, carboxyvinyl polymer, polyacrylate, or polyethylene oxide.

4. A method for improving emulsification that improves emulsification of sugar polymer particles dispersed in water, the method comprising a step of storing the sugar polymer particles dispersed in water at a low temperature of 10° C. or less,
  wherein a hydration layer is formed around the sugar polymer particles dispersed in the water,
  wherein the particle size of the sugar polymer particles is 50 to 800 nm, and
  wherein the sugar polymer constituting the sugar polymer particles is
  (a) a sugar polymer produced by a microorganism using, as a component, saccharides selected from monosaccharides;
  (b) an unmodified natural polymer;
  (c) methyl cellulose, ethyl cellulose, methyl hydroxypropyl cellulose, carboxymethyl cellulose, hydroxymethyl cellulose, hydroxypropyl cellulose, sodium carboxymethyl cellulose, propylene glycol alginate, a cellulose crystal structure, a starch/sodium acrylate graft polymer, hydrophobized hydroxypropyl methylcellulose; or
  (d) polyvinyl alcohol, polyvinyl pyrrolidone, carboxyvinyl polymer, polyacrylate, or polyethylene oxide.

5. A method for producing an emulsion, comprising mixing the emulsifier according to claim 1, and an oily component to be emulsified.

6. The method for producing an emulsion according to claim 5, wherein the oily component to be emulsified is an unsaturated oil.

7. The emulsifier according to claim 1,
  wherein the sugar polymer particles dispersed in the water intervene at an oil/water interface and are attached to the oil phase by van der Waals force, whereby emulsification is possible.

8. The emulsifier according to claim 1,
  wherein the sugar polymer particles dispersed in water are obtained by a method comprising:
  a dispersing step of dispersing granules containing an aggregate of the sugar polymer particles in water to prepare a dispersion;
  a released product producing step of swelling the granules, and breaking hydrogen bonds derived from the granules under reversible conditions, thereby producing a released product of the aggregate whose higher-order structure is released; and
  a particle dispersing step of breaking hydrogen bonds in the aggregate to separate and disperse the sugar polymer particles in the water.

9. The method for improving emulsification that improves emulsification of sugar polymer particles dispersed in water, according to claim 3,
  wherein the sugar polymer particles dispersed in the water intervene at an oil/water interface and are attached to the oil phase by van der Waals force, whereby emulsification is possible.

10. The method for improving emulsification that improves emulsification of sugar polymer particles dispersed in water, according to claim 3,
  wherein the sugar polymer particles dispersed in water are obtained by a method comprising:
  a dispersing step of dispersing granules containing an aggregate of the sugar polymer particles in water to prepare a dispersion;
  a released product producing step of swelling the granules, and breaking hydrogen bonds derived from the granules under reversible conditions, thereby producing a released product of the aggregate whose higher-order structure is released; and
  a particle dispersing step of breaking hydrogen bonds in the aggregate to separate and disperse the sugar polymer particles in the water.

11. The method for improving emulsification that improves emulsification of sugar polymer particles dispersed in water, according to claim 4,
  wherein the sugar polymer particles dispersed in the water intervene at an oil/water interface and are attached to the oil phase by van der Waals force, whereby emulsification is possible.

12. The method for improving emulsification that improves emulsification of sugar polymer particles dispersed in water, according to claim 4,
  wherein the sugar polymer particles dispersed in water are obtained by a method comprising:
  a dispersing step of dispersing granules containing an aggregate of the sugar polymer particles in water to prepare a dispersion;
  a released product producing step of swelling the granules, and breaking hydrogen bonds derived from the granules under reversible conditions, thereby producing a released product of the aggregate whose higher-order structure is released; and
  a particle dispersing step of breaking hydrogen bonds in the aggregate to separate and disperse the sugar polymer particles in the water.

13. The emulsifier according to claim 1, wherein the emulsification aid is a water soluble salt, and the salt is sodium chloride, potassium chloride, magnesium chloride, ammonium chloride, potassium chlorate, ferrous chloride, ferric chloride, sodium carbonate, sodium acetate, sodium succinate, sodium citrate, sodium glutamate, or sodium aspartate.

14. The emulsifier according to claim 1, wherein the sugar polymer constituting the sugar polymer particles is a natural polymer.

15. The emulsifier according to claim 1, wherein the sugar polymer constituting the sugar polymer particles is xanthan gum, gum arabic, guar gum, karaya gum, carrageenan, pectin, fucoidan, quince-seed gum, trant gum, locust bean gum, galactomannan, curdlan, gellan gum, fucogel, casein, gelatin, starch, or collagen.

16. The emulsifier according to claim 1, wherein the sugar polymer constituting the sugar polymer particles is methyl cellulose, ethyl cellulose, methyl hydroxypropyl cellulose, carboxymethyl cellulose, hydroxymethyl cellulose, hydroxypropyl cellulose, sodium carboxymethyl cellulose, propylene glycol alginate, a cellulose crystal structure, a starch/sodium acrylate graft polymer, or hydrophobized hydroxypropyl methylcellulose.

17. The method for improving emulsification according to claim 3, wherein the emulsification aid is a water-soluble salt and the salt is sodium chloride, potassium chloride, magnesium chloride, ammonium chloride, potassium chlorate, ferrous chloride, ferric chloride, sodium carbonate, sodium acetate, sodium succinate, sodium citrate, sodium glutamate or sodium aspartate.

18. The method for improving emulsification according to claim 3, wherein the sugar polymer constituting the sugar polymer particles is natural polymer.

19. The emulsifier according to claim 8, wherein the released product producing step comprises mild stirring at 70 to 90° C.

* * * * *